(12) United States Patent
Katsuno (10) Patent No.: US 7,520,307 B2
(45) Date of Patent: Apr. 21, 2009

(54) PNEUMATIC RADIAL TIRE (75) Inventor: Hiroyuki Katsuno, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 50 days.

(21) Appl. No.: 10/576,415

(22) PCT Filed: Oct. 20, 2004

(86) PCT No.: PCT/JP2004/015513
§ 371 (c)(1),
(2), (4) Date: Apr. 19, 2006

(87) PCT Pub. No.: WO2005/037575
PCT Pub. Date: Apr. 28, 2005

(65) Prior Publication Data
US 2007/0119534 A1 May 31, 2007

(30) Foreign Application Priority Data
Oct. 20, 2003 (JP) ............... 2003-359630

(51) Int. Cl.
B60C 17/00 (2006.01)
B60C 9/00 (2006.01)

(52) U.S. Cl. ............... 152/516; 152/517; 152/520; 152/539; 152/543; 152/546; 152/555

(58) Field of Classification Search ............. 152/516, 152/517, 518, 519, 520, 539, 540, 541, 542, 152/543, 546, 555
See application file for complete search history.

(56) References Cited

FOREIGN PATENT DOCUMENTS

| JP | 48-69202 A | 9/1973 |
|---|---|---|
| JP | 59-206211 A | 11/1984 |
| JP | 11-334326 A | 12/1999 |
| JP | 2000-16036 A | 1/2000 |
| JP | 2001180234 | * 7/2001 |

OTHER PUBLICATIONS

Machine translation of JP 2001180234 (published Jul. 2001).*
European Search Report dated Feb. 18, 2009 (3 pages).

* cited by examiner

Primary Examiner—Justin Fischer
(74) Attorney, Agent, or Firm—Sughrue Mion, PLLC (57) ABSTRACT A pneumatic tire largely improves the run-flat durability while preventing the deterioration of the ride comfort to the input of vibrations to the tire at a normal state and comprises a reinforcing rubber 6 arranged inside a sidewall portion 2 and having a crescent form at its cross section, in which one cord reinforcing layer 9 having a rubberized structure of steel cords is arranged along a turnup portion 5a of a carcass ply 5 around a bead core 4 and an interval between the steel cords in the cord reinforcing layer is within a range of 2.5-20 times a diameter of the cord.

7 Claims, 7 Drawing Sheets

PNEUMATIC RADIAL TIRE

TECHNICAL FIELD

This invention relates to a pneumatic radial tire, and more particularly to a safety tire capable of safely and continuously running a vehicle even if an internal pressure filled in the tire is leaked due to the puncture of the tire or the like. Particularly, the invention proposes a technique of enhancing the running durability after the leakage of the internal pressure or a so-called run-flat durability and also improving the ride comfort against vibrations during the usual running while keeping the internal pressure.

RELATED ART

Heretofore, there have been proposed various safety tires that even if the puncture or the like is caused in the tire by the input of shock to the tire through projections on a road surface, holes, sharp foreign matter and the like, which may be caused during the running of the vehicle, to leak the air pressure filled in the tire, for the purpose of preventing the load supporting ability of the tire from losing and safely and continuously running the vehicle to a place capable of repairing and exchanging the tire, rubber having a relatively high modulus of elasticity and a thickened crescent form in a section thereof is arranged inside a sidewall portion of the tire, whereby an extreme deflection of the sidewall portion is effectively suppressed even when the air pressure filled in the tire lowers up to an atmospheric pressure.

For example, JP-A-H03-143710 proposes a technique in which for the purpose of improving the run-flat performance while suppressing the increase of the weight without damaging the assembling property onto a rim in this type of the safety tire having the reinforcing rubber of a crescent form in the section, a cord reinforced body comprised of one or more reinforcing plies containing reinforcing cords is arranged in an inner face of the reinforcing rubber. Also, JP-A-H11-334326 proposes a technique in which for the purpose of improving the above proposed technique to further improve the run-flat performance, the reinforcing rubber is arranged inside the carcass, while a reinforcing filler layer comprised of one or more reinforcing plies is arranged outside the carcass and an upper end height of the reinforcing filler layer is 38-49% of a tire section height and the turnup portion of the carcass is extended upward over the upper end of the reinforcing filler layer.

DISCLOSURE OF THE INVENTION

Since all of these proposed techniques are a main object of suppressing the deflection deformation of the sidewall portion during the run-flat running to improve the run-flat durability and select only the arranging position of the cord reinforced body or the reinforcing filler layer strengthening the sidewall portion with respect to the reinforcing rubber in addition to the reinforcing rubber, there is a problem that the deflection rigidity of the sidewall portion and hence up-down rigidity of the tire becomes too high at a normal state of the tire before the puncture or the like of the tire, or in other words, at a state of filling a given air pressure to the tire to increase the transferring ratio of vibrations onto a wheel and hence the ride comfort of the vehicle is deteriorated by the input of the vibrations to the tire.

The invention is a subject matter of solving the above problems of the conventional techniques, and an object thereof is to provide a pneumatic radial tire capable of effectively preventing the deterioration of the ride comfort against input of vibrations to a normal tire and largely improving the run-flat durability, which is particularly effective for tires having an aspect ratio of not more than 60%.

The pneumatic radial tire according to the invention comprises a tread portion, a pair of sidewall portions continuously extending from each side end portion of the tread portion inward in a radial direction, a bead portion disposed at an inner peripheral side of the respective sidewall portion, a radial carcass toroidally extending between a pair of bead cores embedded in the respective bead portions and comprised of one or more carcass plies, each side portion of which ply being wound around the bead core outward in the radial direction, and a reinforcing rubber arranged inside the sidewall portion and further inside the radial carcass and having a crescent form at its cross section, in which one or more cord reinforcing layers having a rubberized structure of steel cords are arranged along a turnup portion of the carcass ply around the bead core, and an interval between the steel cords in the cord reinforcing layer, i.e. a shortest distance between the steel cords as measured at an end portion at an inner peripheral side of the cord reinforcing layer is a range of 2.5-20 times or 5-12 times a diameter of the cord.

Moreover, the term "diameter of cord" used herein means a diameter of a circumscribed circle when the steel cord is a twisted cord.

The ride comfort against vibrations at a normal state of the tire is more enhanced and the run-flat durability can be further enhanced in tires for SUV series vehicles according to the former case and in tires for passenger cars according to the latter case.

In other words, when the interval is less than 2.5 times or 5 times, respectively, the end count of the steel cords and hence the in-plane shear rigidity of the sidewall portion becomes too high and the separation failure at inner and outer end portions of the cord reinforcing layer is apt to be easily caused due to the stepwise difference of the rigidity but also a fear of deteriorating the ride comfort and vibration characteristic at the normal state of the tire due to the increase of the bending rigidity of the cord reinforcing layer itself becomes high. On the other hand, when it exceeds 20 times or 12 times, the cord interval is too wide and hence it is difficult to ensure the required in-plane shear rigidity.

Preferably, a shear rigidity in a diagonal direction of a square defined by a radial line segment and a circumferential line segment in a plane of the sidewall portion at a part integrally viewing the mutually adjoining cord reinforcing layer and turnup portion of the carcass ply, i.e. a shear rigidity measured in a diagonal direction directing to the outer peripheral side of the tire when the sidewall portion is projected on a flat plane to define a square by microscopically radial line segment and circumferential line segment (hereinafter referred to as in-plane shear rigidity) is a range of 300-1000 MPa in case that an elongation of the steel cord is less than 0.5%, and a range of 1000-15000 MPa in case that the elongation is not less than 0.5%.

With respect to safety tires having the reinforcing rubber arranged inside the sidewall portion, as a result of observing troubles caused by run-flat running at a state of decreasing the tire internal pressure to atmospheric pressure, many cracks extending in the circumferential direction are visually observed in the vicinity of maximum bending region at the inner face of the tire. It is revealed that these cracks are caused by a large influence of a circumferential strain of the sidewall portion accompanied with the leading and trailing of the treading face rather than compression deflection of the sidewall portion just under loading.

Incidentally, it is discovered that such a circumferential strain is small in the tire inflated under the internal pressure, but is a strain component inherent to the run-flat running which increases in the run-flat running, particularly in the input of lateral force to the tire. As a result of the analysis on the circumferential strain, it has been found that in order to reduce the circumferential strain, it is effective to suppress the circumferential deformation in a foot region of a rim guard in the sidewall portion, or in a region from an outer peripheral end of the rim guard toward a shoulder side within a range of 25% of a tire section height and to suppress the shear deformation in the aforementioned plane of the sidewall portion.

Focusing on the aforementioned in-plane shear rigidity in case of integrally viewing the cord reinforcing layer and the turnup portion of the carcass ply adjacent thereto, when the elongation of the steel cord constituting the cord reinforcing layer is less than 0.5%, the shear rigidity is rendered into 300-1000 MPa, while when the elongation of the steel cord is not less than 0.5%, the shear rigidity is rendered into 1000-15000 MPa, whereby the shear rigidity is suppressed at a sufficiently low value at a normal state of the tire, in which the elongation of the steel cord is small, to effectively control the increase of up-down rigidity of the tire and hence the deterioration of the ride comfort against vibrations, while the shear rigidity is increased in the run-flat running, in which the elongation of the steel cord becomes not less than 0.5%, to suppress the compression deflection of the sidewall portion and largely improve the run-flat durability.

At this moment, the reason why 0.5% is a borderline value with respect to the elongation of the steel cord is due to the fact that the elongation of the cord is less than 0.5% at the normal state of the tire under an inflation of as given internal pressure, while the elongation of the cord becomes not less than 0.5% in the run-flat running.

When the in-plane shear rigidity at the elongation of less than 0.5% is 300-1000 MPa, the excellent ride comfort against vibrations is ensured while suppressing the increase of the up-down rigidity of the tire, while when it exceeds 1000 MPa, the ride comfort and vibration characteristic are deteriorated. Moreover, the reason why the lower limit is 300 MPa is due to the fact that when it is less than 300 MPa, even if the elongation of the cord becomes not less than 0.5% in the run-flat running, the required in-plane shear rigidity can not be developed.

On the other hand, when the in-plane shear rigidity in the run-flat running at the elongation of the cord of not less than 0.5% is 1000-15000 MPa, the circumferential deformation at the foot region of the rim guard and the in-plane shear deformation can be effectively suppressed to largely improve the run-flat durability.

That is, when it is less than 1000 MPa, the effect of sufficiently reducing the circumferential strain in the run-flat running can not be attained, while when it exceeds 15000 MPa, the stepwise difference of the rigidity between the arranging region of the cord reinforcing layer and the non-arranging region thereof becomes too large, and hence strain concentrates in the radially inner and outer end portions of the cord reinforcing layer and the deterioration of the run-flat durability due to the separation of the cord reinforcing layer is unavoidable.

Preferably, the cord reinforcing layer is constructed with twisted cords in which a borderline of an elastic modulus between a low elastic region of not more than 50000 MPa and a high elastic region of not less than 110000 MPa is existent at the elongation of the steel cord of not less than 0.5% but not more than 2.5%.

In this case, with respect to SUV series vehicles, the rigidity of the cord can be controlled to a low value at the normal state of the tire, in which the elongation of the steel cord is small, to attain the improvement of the ride comfort, while the high cord rigidity can be developed in the run-flat running to enhance the effect of reducing the strain and improve the run-flat durability.

On the other hand, when the cord reinforcing layer is constructed with twisted cords having a non-linear characteristic that the elastic modulus at the elongation of the steel cord of less than 0.5% is not more than 50000 MPa and the elastic modulus at the elongation of the steel cord of not less than 0.5% is not less than 110000 MPa, with respect to the tire for the passenger car in which the elongation of the steel cord at the normal state of the tire is smaller than that in the SUV series vehicle, the cord rigidity at the normal state can be suppressed to a low value to improve the ride comfort, and the high cord rigidity can be developed in the run-flat running to enhance the effect of reducing the strain and improve the run-flat durability.

In any case, when the elastic modulus at a low elongation zone of the cord is a value exceeding 50000 MPa, the high cord rigidity is developed at the normal state of the tire to highly fear the deterioration of the ride comfort and vibration characteristic, while when the elastic modulus at a high elongation zone is less than 110000 MPa, the effect of reducing the strain in the run-flat running, particularly in the input of lateral force becomes lower and hence the breakage strain can not be sufficiently reduced and it is difficult to improve the run-flat durability.

Moreover, the elongation of the cord at the normal state of the tire in the SUV series vehicle generally tends to be larger than that in the tire for passenger car, so that the limit elongation at the low elastic modulus region is within a range of 0.5-2.5% wider than that of the tire for passenger car.

It is preferable that an intersecting angle of the steel cord in the cord reinforcing layer at its mid point with respect to a meridional segment of the tire is within a range of 50-75°.

Noting only the in-plane shear rigidity between the cord reinforcing layer and the turnup portion of the carcass adjacent thereto, it becomes maximum at the intersecting angle of 45°, while the circumferential rigidity becomes maximum at the intersecting angle of 90°.

As the intersecting angle capable of efficiently establishing both the rigidities is actually measured, the intersecting angle is most effective to be a range 50-75°.

In other words, when it is less than 50°, it is difficult to ensure the high circumferential rigidity, while when it exceeds 75°, the circumferential rigidity can be ensured, but it is difficult to ensure the high in-plane shear rigidity, and hence the sufficient improvement of the suppressing effect of the circumferential strain can not be guarantied.

At this moment, the intersecting angle of the steel cord with respect to the meridional segment is a range of 50-75° which is capable of establishing the circumferential rigidity and the in-plane shear rigidity.

Moreover, in case of arranging a plurality of the cord reinforcing layers, the steel cords are extended symmetrically between these layers with respect to the meridional segment.

Preferably, the cord reinforcing layer is arranged between the bead filler disposed above the bead core outward in the radial direction and the turnup portion of the carcass ply within a range of a radial zone ranging from a part corresponding to a contact region between the bead portion and the rim flange to a part corresponding to a position of a maximum tire width.

In this case, the contact region between the bead portion and the rim flange means a contact region of the outer surface of the bead portion with an inner face of the rim flange at a state of assembling the tire onto an approved rim and filling a predetermined air pressure therein, and the maximum tire width means a section width obtained by subtracting pattern, letters and the like on the side face of the tire from a total width of the tire.

Moreover, the approved rim is a rim defined by the following standard, and the predetermined air pressure is an air pressure corresponding to a maximum load capacity defined by the following standard, and the maximum load capacity is a maximum mass applicable to the tire by the following standard.

The standard is an industrial standard effective in places producing or using tires, and is, for example, "YEAR BOOK of THE TIRE AND RIM ASSOCIATION INC." in USA, "STANDARD MANUAL of The European Tyre and Rim Technical Organization" in Europe, and "JATMA YEAR BOOK" of The Japan Automobile Tire Manufacturers Association Inc. in Japan.

By selecting the arranging position of the cord reinforcing layer as mentioned above, the separation of the cord reinforcing layer at the radially inner and outer ends can be prevented effectively. In other words, if the cord reinforcing layer is arranged outside the turnup portion of the carcass ply, the separation is easily caused at the radially inner and outer ends of the cord reinforcing layer due to the concentration of extreme strain.

Also, the aforementioned radially arranging zone of the cord reinforcing layer is a zone of producing a large circumferential strain by leading and trailing in the run-flat running of the tire, so that the actual effect of the reinforcement can be largely enhanced by arranging the cord reinforcing layer on such a zone.

As to the reinforcing width and the reinforcing position of the cord reinforcing layer, when it has a radial width corresponding to 35-48% of a tire section height and when a radially outer end is positioned at a height corresponding to not more than 50% of the tire section height, the zone of particularly increasing the circumferential strain in the run-flat running of the tire can be effectively covered with the cord reinforcing layer, and also the increase of up-down rigidity of the tire at the normal state can be suppressed by positioning the radially outer end to the height corresponding to not more than 50% of the tire section height to prevent the deterioration of the ride comfort against vibrations.

The tire section height means a ½ value of a difference between an outer diameter of the tire and a rim diameter at a state of assembling the tire onto the approved rim and filling the predetermined air pressure therein.

BEST MODE FOR CARRYING OUT THE INVENTION

Figure 1:
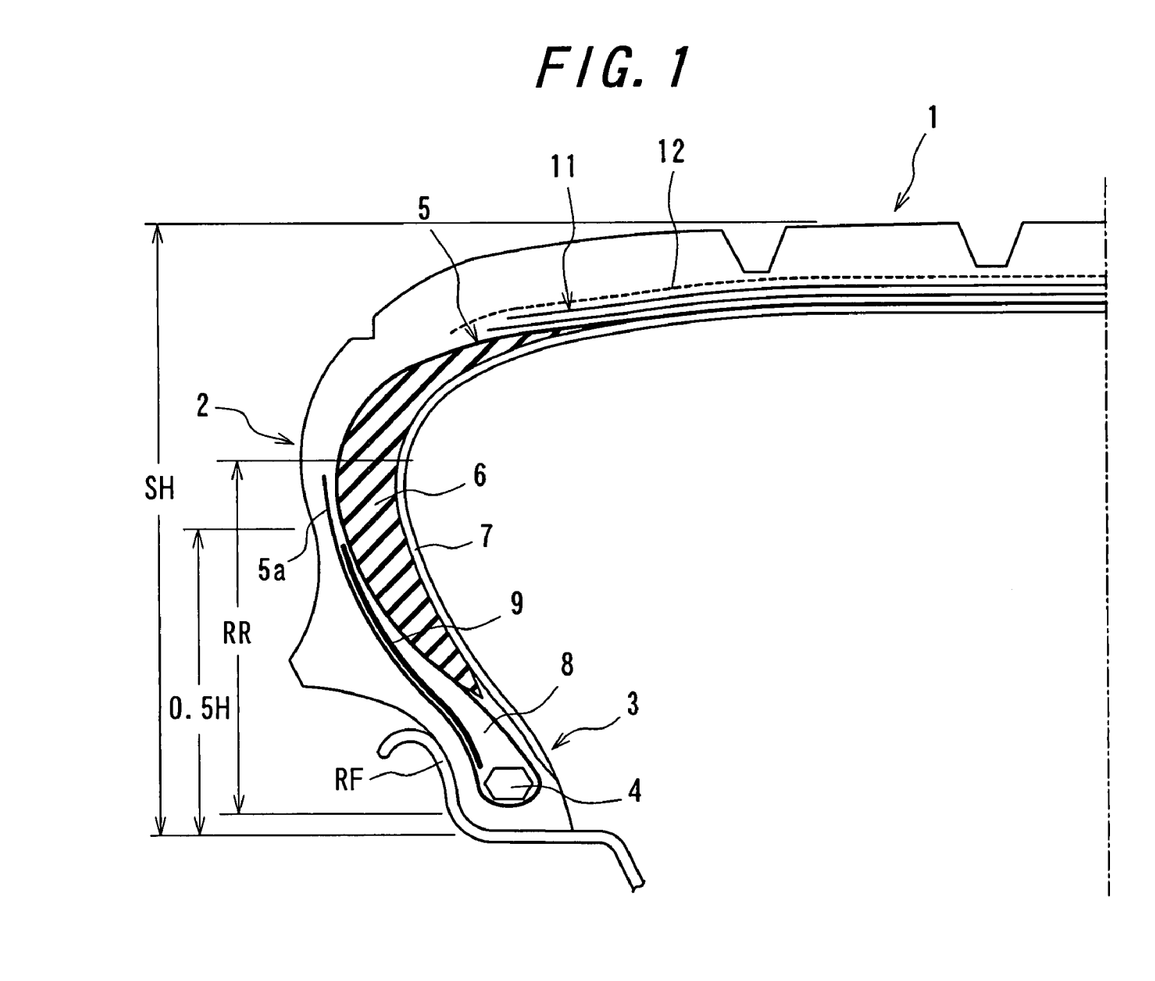
FIG. 1 is a widthwise section view of a half part of the tire according to an embodiment of the invention.

FIG. 1 is a widthwise section view of a half part of the tire according to an embodiment of the invention at a posture of assembling this tire onto an approved rim and filling a predetermined air pressure therein, wherein numeral 1 is a tread portion, numeral 2 a sidewall portion continuously extending from a side portion of the tread portion 1 inward in a radial direction, and numeral 3 a bead portion continuously arranged at an inner peripheral side of the sidewall portion 2.

In the respective bead portion 3 is embedded a bead core 4, and at least one carcass ply, one carcass ply 5 in the illustrated embodiment is toroidally extended between both the bead cores 4, and a side portion of the carcass ply 5 is wound around the bead core 4 outward in the radial direction to form a turnup portion 5a. A radial carcass forming the skeleton structure of the tire is constituted with the carcass ply 5.

In this case, an intersecting angle of cords in the carcass ply 5 with respect to an equatorial plane of the tire may be, for example, a range of 70-90°.

Also, a reinforcing rubber 6 made from a relatively high-hardness rubber material and having a crescent form at its cross section is arranged inside the sidewall portion 2 and further inside the carcass ply 5.

At this moment, a radially outer portion of the illustrated reinforcing rubber 6 is somewhat entered into an inner peripheral side of the tread portion, but it is possible to terminate the outer portion without entering into the inner peripheral side of the tread portion 2.

Moreover, numeral 7 is an innerliner arranged further inside the reinforcing rubber 6, and numeral 8 a bead filler arranged at the outer peripheral side of the bead core 4 and gradually decreasing its thickness outward in the radial direction.

Further, one ore more cord reinforcing layers, e.g. one cord reinforcing layer 9 having a rubberized structure of steel cords is arranged between the bead filler 8 and the turnup portion 5a of the carcass ply 5, in which an in-plane shear rigidity viewing an integral body of the cord reinforcing layer 9 and the turnup portion 5a is 300-1000 MPa in case that the elongation of the steel cord is less than 0.5% and 1000-15000 MPa in case that the elongation is not less than 0.5%.

Figure 2:
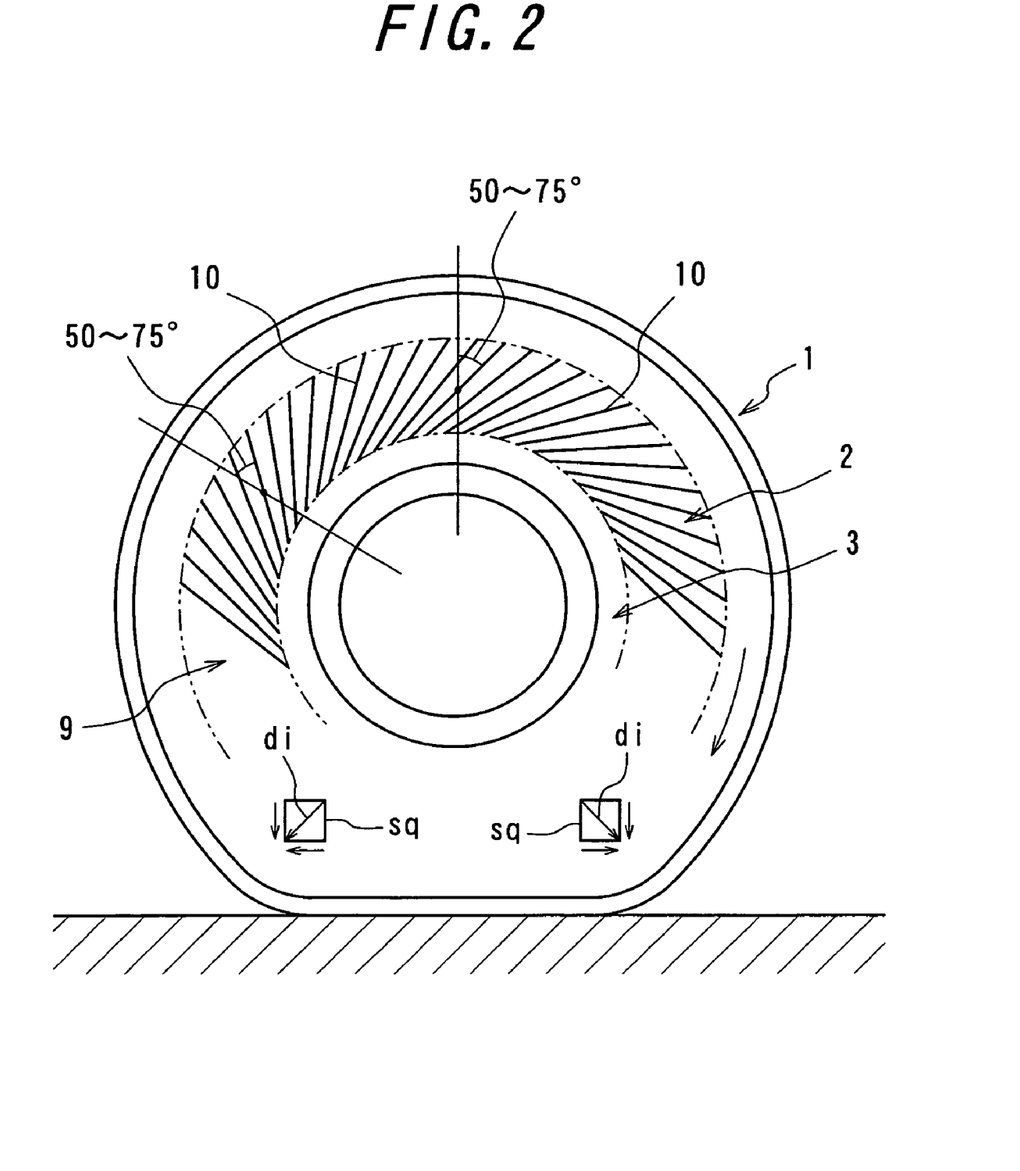
FIG. 2 is a view of a tire sidewall portion projected on a flat plane for illustrating an in-plane shear rigidity and an extending example of steel cord in a cord reinforcing layer.

At this moment, the in-plane shear rigidity means a shear rigidity measured in a diagonal direction di directing to the outer peripheral side of the tire when the sidewall portion 2 is projected on a flat plane to define a phantom square sq by microscopically radial line segment and circumferential line segment as two-dimensionally and exaggeratedly shown in FIG. 2. When the in-plane shear rigidity is made sufficiently large in the run-flat running of the tire, the circumferential strain accompanied with the leading and trailing deformations of the tire can be advantageously suppressed, while when the in-plane shear rigidity at the normal state of the tire is made small, the deterioration of the ride comfort in the vehicle can be prevented.

Therefore, by specifying the in-plane shear rigidity as mentioned above, the run-flat durability can be largely improved without damaging the ride comfort against vibrations at the normal state of the tire.

Incidentally, the in-plane shear rigidity ($G_{XY}$) can be calculated according to the following equation:

$$\frac{1}{G_{XY}} = \frac{4}{E_{45}} - \left(\frac{1}{E_X} + \frac{1}{E_Y} - \frac{2v_X}{E_X}\right)$$

("Composite Material Technology", edited by Takeshi Hayashi and published by Nikka Giren Shuppansha Co., Ltd.) when the circumferential direction is X and the radial direction is Y and an elastic modulus in the circumferential direction is $E_X$ and an elastic modulus in the radial direction is $E_Y$ and an elastic modulus in a direction of 45° with respect to the circumferential direction X or the diagonal direction di in the figure is $E_{45}$ and a Poisson's ratio to strain in the circumferential direction X is $v_X$.

In such a tire, it is preferable that a cord interval between the steel cords in the cord reinforcing layer having the rubberized structure of steel cords, e.g. a cord interval of steel cords 10 extending in a form shown in FIG. 2 in the projected plane of the sidewall portion is specified as a shortest distance between the cords measured at an inner peripheral end of the cord reinforcing layer 9 and is 2.5-20 times or 5-12 times of a cord diameter.

At this moment, the shortest distance between cords is preferable to be 2.5-20 times of the cord diameter in the tire for SUV series vehicle and 5-12 times in the tire for passenger car.

As the extending form of the steel cords 10 in the projected plane of the sidewall portion, there are considered a case that the cords are linearly extended so as to gradually widen the mutual interval outward in the radial direction as shown in FIG. 2, but also a case that the interval between the steel cords 10 is gradually widened outward in the radial direction and a portion of each of the steel cords 10 located outward from a position of a mid point thereof in the radial direction is curved so as to make large an intersecting angle with respect to the meridional segment as shown in FIG. 3(a) or a case that the steel cords 10 are extended substantially linearly without changing the mutual interval inward and outward in the radial direction as shown in FIG. 3(b). The aforementioned cord interval between the steel cords 10 can be clearly specified even if the steel cord 10 takes any extending forms.

Moreover, the shortest distance between the cords can be identified ex-post, for example, by an X-ray irradiation, dissection of the tire or the like.

In the tire for the SUV series vehicle, the cord reinforcing layer 9 is preferable to be constituted with so-called high-elongation twisted cords in which the borderline between low elastic region having an elastic modulus of not more than 5000 MPa and high elastic region having an elastic modulus of not less than 110000 MPa is existent in the cord elongation of not less than 0.5% but not more than 2.5%. In the tire for the passenger car, the cord reinforcing layer 9 is preferable to be constituted with twisted cords having a non-linear characteristic that an elastic modulus at a cord elongation of less than 0.5% is not more than 50000 MPa and an elastic modulus at a cord elongation of not less than 0.5% is not less than 110000 MPa.

Figure 3:
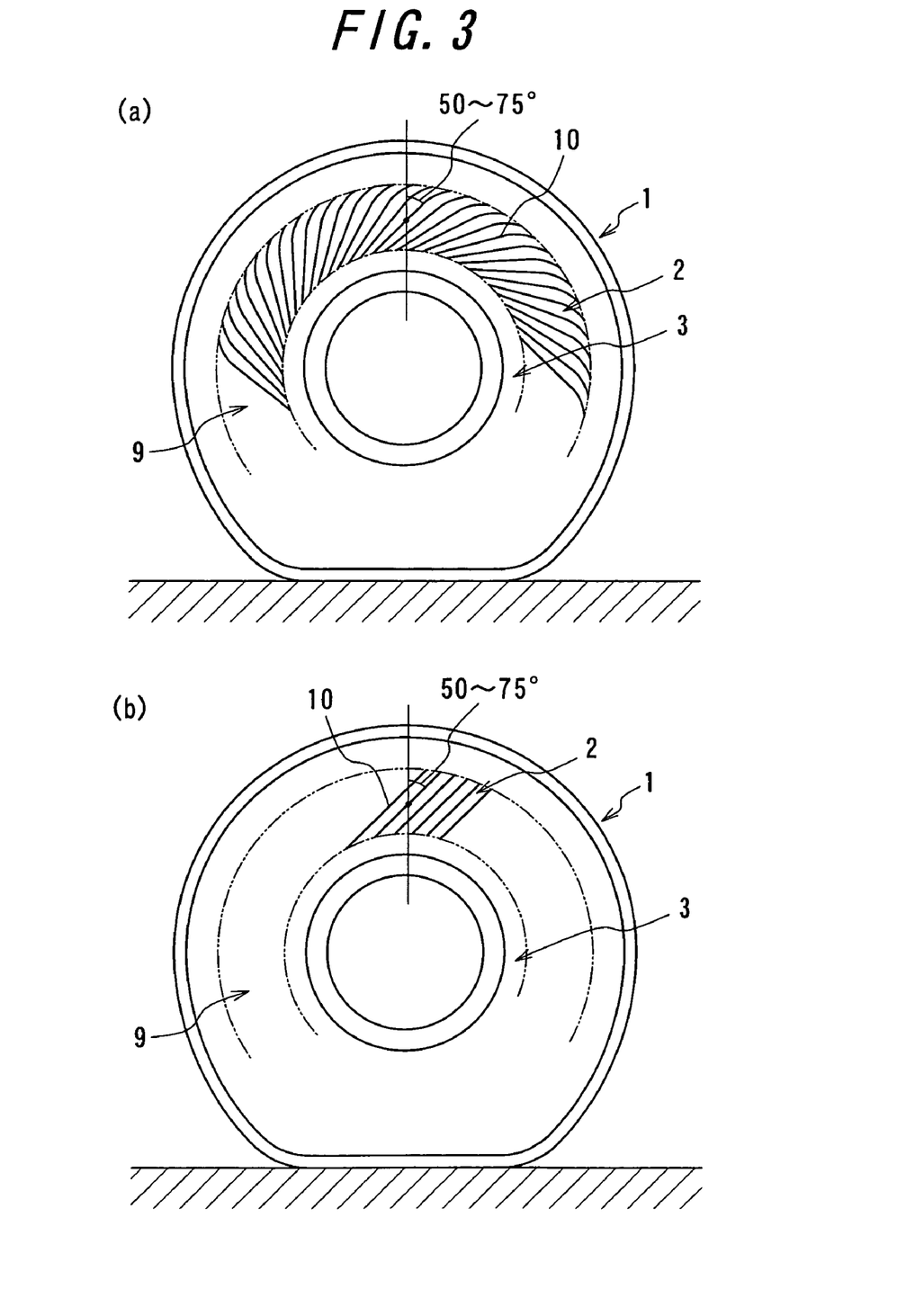
FIG. 3 is a view of a tire sidewall portion projected on a flat plane for illustrating another extending example of steel cord in a cord reinforcing layer.

The intersecting angle of the steel cord at its mid-point position with respect to the meridional segment of the tire is preferable to be a range of 50-75° as the steel cords 10 are partly seen through the tire in FIGS. 2 and 3 for more effectively suppressing the circumferential strain in the sidewall portion. This is true in case of arranging two or more cord reinforcing layers. In the latter case, the steel cords of these cord reinforcing layers are extended symmetrically with respect to the meridional segment.

Preferably, as shown in FIG. 1, the arranging zone of the cord reinforcing layer 9 located between the bead filler 8 and the turnup portion 5a of the carcass ply in the radial direction of the tire is within a range of a radial zone RR ranging from a part corresponding to a contact region of the bead portion 3 with a rim flange RF to a part corresponding to a position of the maximum tire width.

This arranging zone of the cord reinforcing layer 9 has a radial width corresponding to 20-48% of a tire section height SH, and the radially outer end of the cord reinforcing layer 9 is more preferable to be positioned in a height corresponding to not more than 50% of the tire section height SH.

In addition to the above, the tire shown in FIG. 1 comprises a belt 11 arranged on the outer peripheral side of a crown portion of the carcass ply and composed of two belt layers in which cords of these belt layers are mutually extended in opposite directions with respect to the equatorial plane of the tire, and one cap layer 12 arranged on the outer peripheral side of the belt 11 and formed by spirally winding, for example, a ribbon-shaped strip made of one or plural rubberized cords.

EXAMPLES

Example I

There are provided example tires and comparative tires as a safety tire having a tire size of 215/45R17 suitable for general passenger cars and usually used at an air pressure of 230 kPa under a load of 4165 N and capable of running at a run-flat state under an action of a reinforcing rubber disposed inside a carcass ply and having a crescent form at its cross section, in which a cord in the carcass ply is a rayon fiber cord of 1650d/3, and a cord in a belt layer is a steel monofilament cord of 0.21 mm, and an intersecting angle of the cord in each belt layer with respect to an equatorial plane is 20°, and a cord of a cap layer is an aromatic polyamide fiber cord, and a constructing form of one cord reinforcing layer arranged at a position shown in FIG. 1 and having a rubberized structure of steel cords is changed as shown in Table 1. With respect to these tires, the ride comfort against vibrations at a normal state of the tire and the run-flat durability are measured to obtain results as shown in Table 1.

Moreover, the cord in the cord reinforcing layer has a structure of 1×3×4×0.12, a cord diameter of 0.56 mm and a twisting pitch of 3.0 mm.

A control tire in Table 1 is a tire shown in FIG. 1 except that the cord reinforcing layer is omitted and a maximum thickness of the reinforcing rubber is 6.3 mm likewise the example tire and comparative tire.

In Table 1, the larger the index value, the better the result.

The run-flat durability is evaluated by running the tire on a drum at a speed of 90 km/h in a state of rendering the tire internal pressure into an atmospheric pressure through the pulling-out of a valve core under a load of 4165 N until troubles are caused in the tire and measuring a running distance at the occurrence of the trouble. Also, the ride comfort against vibrations is evaluated by measuring unsprung vibrations in the actual running.

TABLE 1

Figure 4:
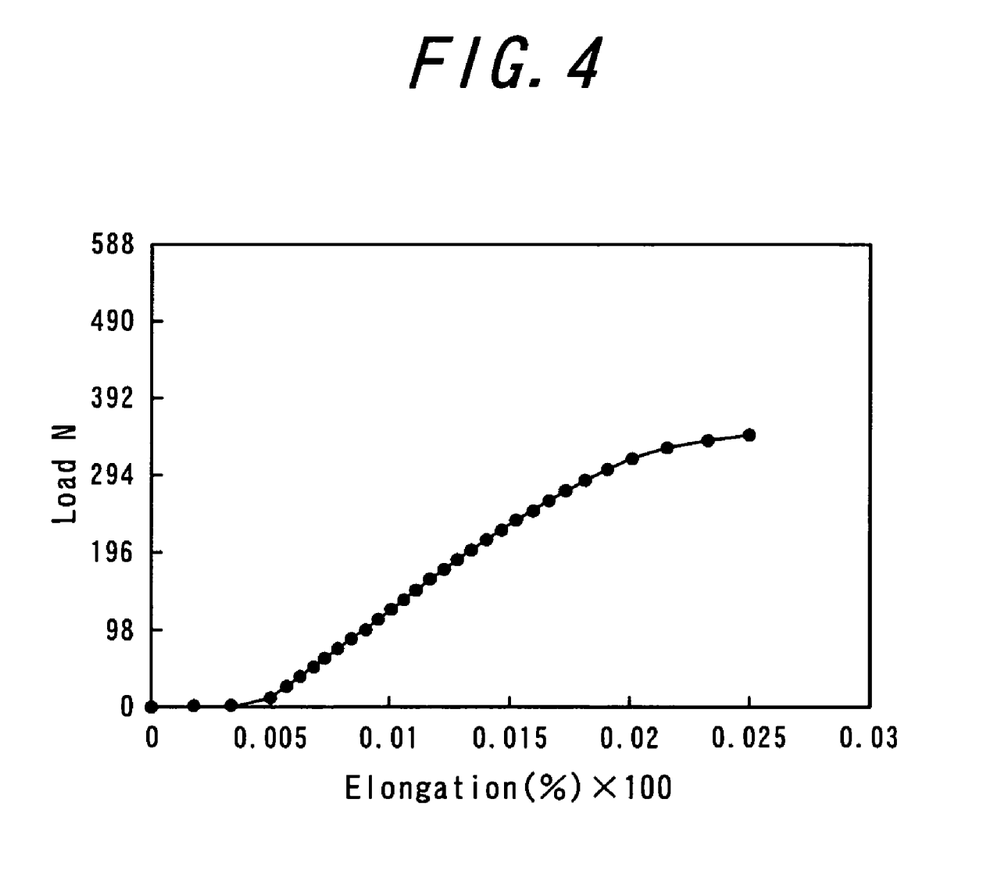
FIG. 4 is a graph showing a load-strain curve of a steel cord.
Figure 5:
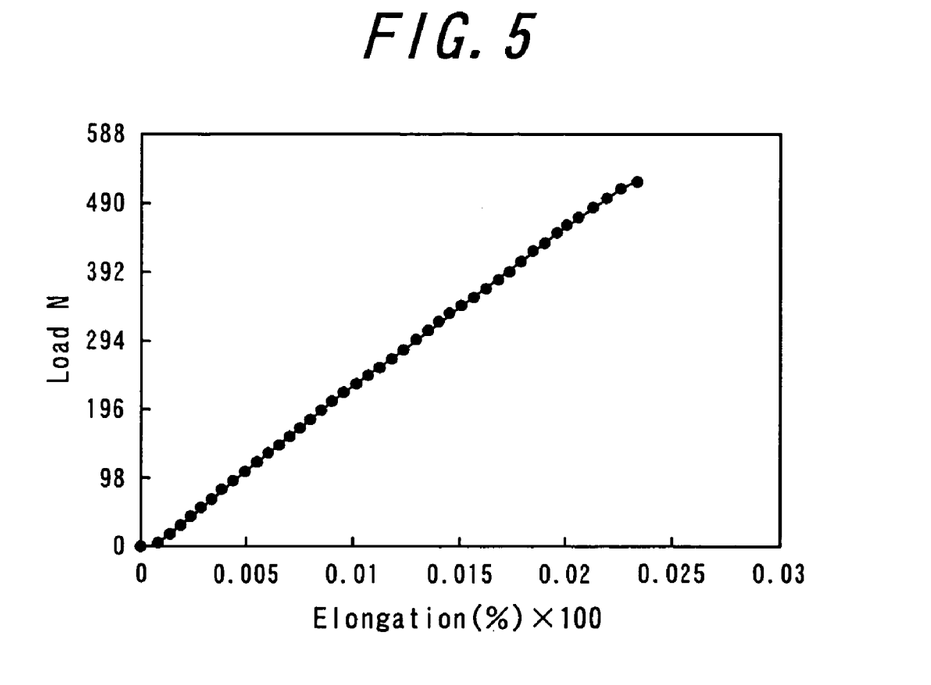
FIG. 5 is a graph showing a load-strain curve of a steel cord in Example tire 19.
Figure 6:
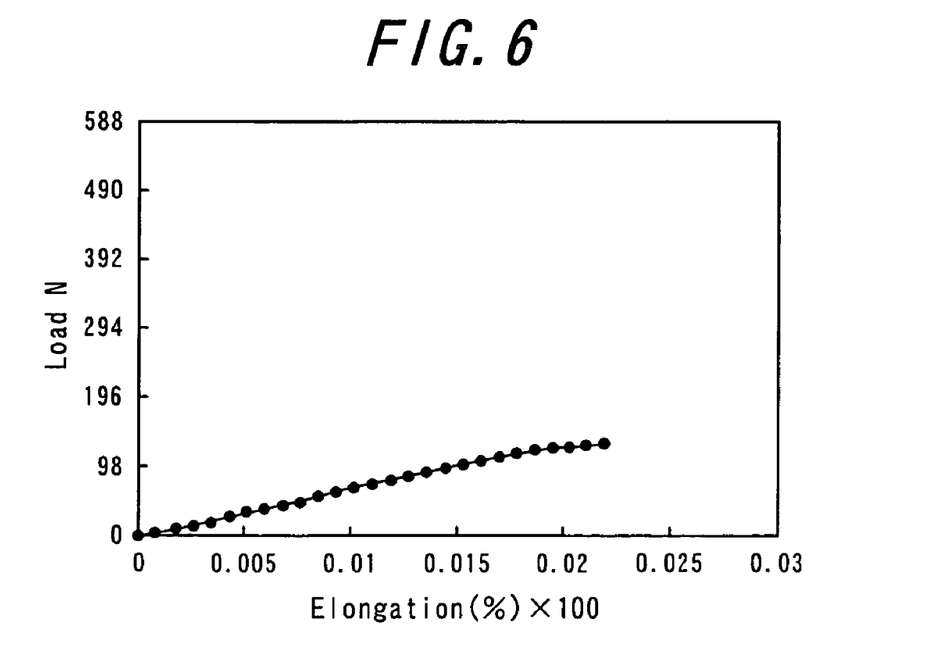
FIG. 6 is a graph showing a load-strain curve of a steel cord in Example tire 20.

| | Cord interval (x times of diameter) | Cord angle | Shear rigidity at normal state (MPa) | Shear rigidity at RF (MPa) | Load-strain curve of cord | Width of reinforcing layer | Height of upper end of reinforcing layer (SH) | Run-flat durability (index) | Ride comfort (index) |
|---|---|---|---|---|---|---|---|---|---|
| Control tire | — | — | — | — | — | — | — | 100 | 100 |
| Comparative tire 1 | 1 | 65 deg | 1500 | 14000 | FIG. 4 | 37% | 45% | 110 | 85 |
| Comparative tire 2 | 2 | 65 deg | 1300 | 12500 | FIG. 4 | 37% | 45% | 140 | 88 |
| Example tire 1 | 2.5 | 65 deg | 950 | 7000 | FIG. 4 | 37% | 45% | 170 | 98 |
| Example tire 2 | 4 | 65 deg | 900 | 5800 | FIG. 4 | 37% | 45% | 180 | 98 |
| Example tire 3 | 5 | 65 deg | 850 | 4000 | FIG. 4 | 37% | 45% | 199 | 99 |
| Example tire 4 | 8 | 65 deg | 800 | 3000 | FIG. 4 | 37% | 45% | 198 | 99 |
| Example tire 5 | 10 | 65 deg | 700 | 2400 | FIG. 4 | 37% | 45% | 182 | 100 |
| Example tire 6 | 12 | 65 deg | 600 | 1800 | FIG. 4 | 37% | 45% | 165 | 100 |
| Example tire 7 | 14 | 65 deg | 500 | 1400 | FIG. 4 | 37% | 45% | 155 | 100 |
| Example tire 8 | 20 | 65 deg | 400 | 1100 | FIG. 4 | 37% | 45% | 150 | 100 |
| Comparative tire 3 | 22 | 65 deg | 100 | 700 | FIG. 4 | 37% | 45% | 95 | 100 |
| Example tire 9 | 10 | 45 deg | 1100 | 4500 | FIG. 4 | 37% | 45% | 200 | 89 |
| Example tire 10 | 10 | 50 deg | 950 | 4000 | FIG. 4 | 37% | 45% | 199 | 99 |
| Example tire 11 | 10 | 75 deg | 400 | 1200 | FIG. 4 | 37% | 45% | 152 | 100 |
| Example tire 12 | 10 | 80 deg | 300 | 900 | FIG. 4 | 37% | 45% | 135 | 100 |
| Example tire 13 | 10 | 65 deg | 650 | 2250 | FIG. 4 | 15% | 45% | 147 | 100 |
| Example tire 14 | 10 | 65 deg | 680 | 2300 | FIG. 4 | 20% | 43% | 178 | 100 |
| Example tire 15 | 10 | 65 deg | 710 | 2500 | FIG. 4 | 45% | 45% | 185 | 99 |
| Example tire 16 | 10 | 65 deg | 704 | 2400 | FIG. 4 | 37% | 65% | 180 | 89 |
| Example tire 17 | 10 | 65 deg | 709 | 2400 | FIG. 4 | 37% | 80% | 181 | 86 |
| Example tire 18 | 10 | 65 deg | 720 | 2450 | FIG. 4 | 90% | 95% | 184 | 89 |
| Example tire 19 | 2.5 | 65 deg | 1020 | 7000 | FIG. 5 | 37% | 45% | 168 | 90 |
| Example tire 20 | 20 | 65 deg | 302 | 900 | FIG. 6 | 37% | 45% | 102 | 100 |

As seen from Table 1, all of the example tires can largely improve the run-flat durability.

Moreover, the deterioration of the ride comfort can not be avoided in the example tires 9 and 19 because the shear rigidity at the normal state is too high, while the ride comfort is deteriorated in the example tires 16-18 because the width of the cord reinforcing layer is too wide or the height of the upper end is too high.

Example II

There are provided example tires and comparative tires as a safety tire having a tire size of 216/55R19 suitable for SUV and usually used at an air pressure of 200 kPa under a load of 8820 N and capable of running at a run-flat state under an action of a reinforcing rubber disposed inside a carcass ply and having a crescent form at its cross section, in which a cord in each of three carcass plies is a rayon fiber cord of 1650d/3, and a cord in each of two belt layers is a steel cord formed by twisting five steel filaments of 0.22 mm in a layer form, and an intersecting angle of the cord in each belt layer with respect to an equatorial plane of the tire is 20°, and a cord in a cap layer is an aromatic polyamide fiber cord, and a constructing form of a cord reinforcing layer arranged at a position shown in FIG. 1 and having a rubberized structure of steel cords is changed as shown in Table 2. With respect to these tires, the ride comfort against vibrations at a normal state of the tire and the run-flat durability are measured to obtain results as shown in Table 2.

Moreover, the cord in the cord reinforcing layer has a structure of 1×3×4×0.12, a cord diameter of 0.56 mm and a twisting pitch of 3.0 mm.

A control tire in Table 2 has a basic structure shown in FIG. 1 except that the cord reinforcing layer is omitted and a maximum thickness of the reinforcing rubber is 12.4 mm likewise the example tire and comparative tire.

In Table 2, the larger the index value, the better the result.

The run-flat durability is evaluated by running the tire on a drum at a speed of 90 km/h in a state of rendering the tire internal pressure into an atmospheric pressure through the pulling-out of a valve core under a load of 8820 N until troubles are caused in the tire and measuring a running distance at the occurrence of the trouble likewise Example I, while the ride comfort against vibrations is evaluated by measuring unsprung vibrations in the actual running.

TABLE 2

Figure 7:
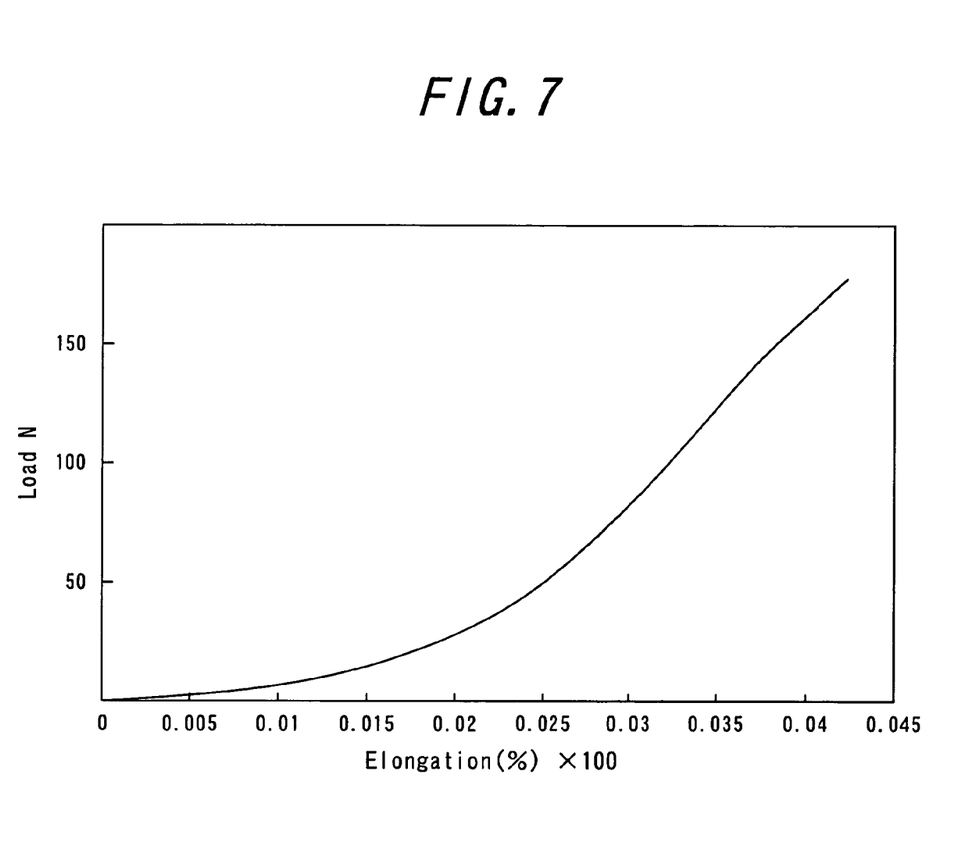
FIG. 7 is a graph showing a load-strain curve of a steel cord in Example tires 21 and 22.
Figure 8:
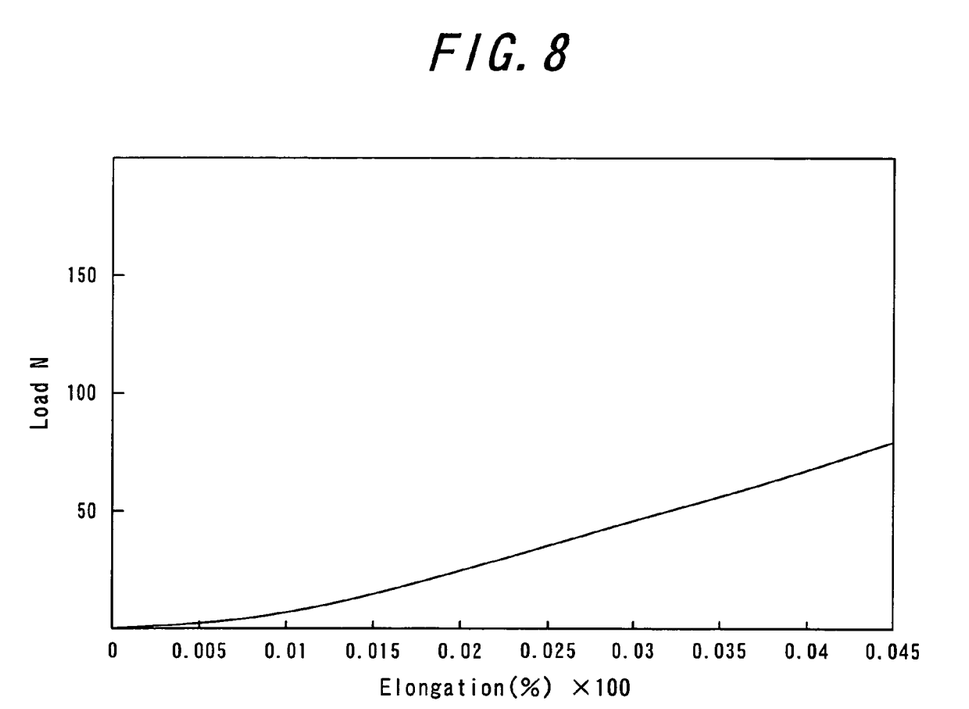
FIG. 8 is a graph showing a load-strain curve of a steel cord in Comparative tire 4.

| | Cord interval (x times of diameter) | Cord angle | Shear rigidity at normal state (MPa) | Shear rigidity at RF (MPa) | Load-strain curve of cord | Width of reinforcing layer | Height of upper end of reinforcing layer (SH) | Run-flat durability (index) | Ride comfort (index) |
|---|---|---|---|---|---|---|---|---|---|
| Control tire | — | — | — | — | — | — | — | 100 | 100 |
| Example tire 21 | 10 | 65 deg | 700 | 3000 | FIG. 7 | 37% | 45% | 180 | 100 |
| Example tire 22 | 10 | ±65 deg (two layers) | 700 | 5600 | FIG. 7 | 37% | 45% | 200 | 99 |
| Comparative tire 4 | 10 | 65 deg | 200 | 800 | FIG. 8 | 37% | 45% | 85 | 100 |

As seen from Table 2, all of the example tires can advantageously improve the run-flat durability without damaging the ride comfort against vibrations.

INDUSTRIAL APPLICABILITY

According to the tire of the invention, the in-plane shear rigidity of the sidewall portion is particularly specified viewing integrally the cord reinforcing layer and the turnup portion of the carcass ply adjacent thereto, whereby the run-flat durability of the tire can be largely improved while preventing the deterioration of the ride comfort to the vehicle due to the input of vibrations to the tire at a normal state.

The invention claimed is:

1. A pneumatic radial tire comprising a tread portion, a pair of sidewall portions continuously extending from each side end portion of the tread portion inward in a radial direction, a bead portion disposed at an inner peripheral side of the respective sidewall portion, a radial carcass toroidally extending between a pair of bead cores embedded in the respective bead portions and comprised of one or more carcass plies, each side portion of which ply being wound around the bead core outward in the radial direction, and a reinforcing rubber arranged inside the sidewall portion and further inside the radial carcass and having a crescent form at its cross section, in which one or more cord reinforcing layers having a rubberized structure of steel cords are arranged along a turnup portion of the carcass ply around the bead core, and an interval between the steel cords in the cord reinforcing layer is a range of 2.5-20 times a diameter of the cord, wherein the steel cords in the cord reinforcing layer are such a twisted cord that a shear rigidity in a diagonal direction of a square defined by a radial line segment and a circumferential line segment in a plane of the sidewall portion at a part integrally viewing the mutually adjoining cord reinforcing layer and turnup portion of the carcass ply is a range of 300-1000 MPa at a normal state of the tire wherein an elongation of the steel cord is less than 0.5%, and a range of 1000-15000 MPa at a run-flat running of the tire wherein the elongation is not less than 0.5%.

2. A pneumatic radial tire according to claim 1, wherein the interval between the steel cords in the cord reinforcing layer is a range of 5-12 times a diameter of the cord.

3. A pneumatic radial tire according to claim 1, wherein the cord reinforcing layer is constructed with twisted cords in which a borderline of an elastic modulus between a low elastic region of not more than 50000 MPa and a high elastic region of not less than 110000 MPa is existent at an elongation of the steel cord of not less than 0.5% but not more than 2.5%.

4. A pneumatic radial tire according to claim 1, wherein the cord reinforcing layer is constructed with twisted cords having a non-linear characteristic that an elastic modulus at the elongation of the steel cord of less than 0.5% is not more than 50000 MPa and an elastic modulus at the elongation of the steel cord of not less than 0.5% is not less than 110000 MPa.

5. A pneumatic radial tire according to claim 1, wherein the cord reinforcing layer is arranged between the bead filler disposed above the bead core outward in the radial direction and the turnup portion of the carcass ply within a range of a radial zone ranging from a part corresponding to a contact region between the bead portion and the rim flange to a part corresponding to a position of a maximum tire width.

6. A pneumatic radial tire according to claim 1, wherein the cord reinforcing layer has a radial width corresponding to 20-48% of a tire section height and a radially outer end of the cord reinforcing layer is positioned at a height corresponding to not more than 50% of the tire section height.

7. A pneumatic radial tire according to claim 1, wherein an intersecting angle of the steel cord in the cord reinforcing layer with respect to a meridional segment of the tire is within a range of 50-75°.

* * * * *